United States Patent
Li et al.

(10) Patent No.: US 8,873,191 B2
(45) Date of Patent: Oct. 28, 2014

(54) FLY-HEIGHT CONTROL AND TOUCHDOWN DETECTION

(71) Applicant: HGST Netherlands B.V., Amsterdam (NL)

(72) Inventors: Jianhua Li, Sagamihara (JP); Kenichi Kuramoto, Fujisawa (JP); Toshiya Shiramatsu, Ebina (JP); Yuichi Aoki, Sagamihara (JP); Masaru Furukawa, Fujisawa (JP); Yuichiro Sano, Ebina (JP)

(73) Assignee: HGST Netherlands B.V., Amsterdam (NL)

( * ) Notice: Subject to any disclaimer, the term of this patent is extended or adjusted under 35 U.S.C. 154(b) by 0 days.

(21) Appl. No.: 13/830,776

(22) Filed: Mar. 14, 2013

(65) Prior Publication Data

US 2014/0268386 A1  Sep. 18, 2014

(51) Int. Cl.
G11B 5/56 (2006.01)
G11B 5/60 (2006.01)

(52) U.S. Cl.
CPC ................................ G11B 5/607 (2013.01)
USPC ......................................................... 360/75

(58) Field of Classification Search
None
See application file for complete search history.

(56) References Cited

U.S. PATENT DOCUMENTS

| | | | |
|---|---|---|---|
| 5,771,571 A * | 6/1998 | Voldman et al. ............ 29/603.12 |
| 6,288,856 B1 | 9/2001 | Ottesen et al. | |
| 6,700,724 B2 | 3/2004 | Riddering et al. | |
| 6,876,509 B2 * | 4/2005 | Bonin et al. ..................... 360/75 |
| 7,042,670 B2 | 5/2006 | Feng et al. | |
| 7,233,451 B2 | 6/2007 | Baumgart et al. | |
| 7,729,080 B2 | 6/2010 | Suzuki | |
| 7,839,595 B1 | 11/2010 | Chue et al. | |
| 7,969,681 B2 * | 6/2011 | Satoh et al. ..................... 360/75 |
| 8,059,357 B1 | 11/2011 | Knigge et al. | |
| 2011/0141603 A1 | 6/2011 | Kazusawa et al. | |
| 2011/0157736 A1 | 6/2011 | Contreras et al. | |

OTHER PUBLICATIONS

Boettcher, Uwe et al., "Dynamic Flying Height Adjustment in Hard Disk Drives Through Feed Forward Control", http://ieeexplore.ieee.org/stamp/stamp.jsp?tp=&arnumber=5928981 &isnumber=5928973,(Jul. 2011), vol. 47, No. 7.

Peng, Jih-Ping et al., "Pressure Sensor Implementation for Head Media Spacing Reduction", *IEEE* Transactions on Magnetics, vol. 46, No. 3, http://ieeexplore.ieee.org/stamp/stamp.jsp?arnumber=5415805, (Mar. 2010).

Boettcher, Uwe et al., "Servo Signal Data Processing for Flying Height Control in Hard Disk Drives", Center for Magnetic Recording Research, No. 33, Winter 2010, http://cmrr.ucsd.edu/research/documents/Number33Winter2010paper2.pdf.

* cited by examiner

Primary Examiner — K. Wong

(57) ABSTRACT

An embedded contact sensor (ECS) element for fly-height control and touchdown detection. An embedded contact sensor (ECS) element with a resistance that changes with a temperature change, which senses a clearance change between a head slider and a disk of a disk drive. A resistance measurement section, within said head IC, that determines a value of direct current resistance (DCR) of said ECS element, wherein said value of DCR changes with a temperature change, wherein said temperature change is caused by an air bearing cooling and frictional induced heating at a head disk interface. A resistance slope to fly-height conversion section that dynamically determines a target fly-height value for said head slider over said disk based on changes in said value of DCR.

20 Claims, 6 Drawing Sheets

FLY-HEIGHT CONTROL AND TOUCHDOWN DETECTION

TECHNICAL FIELD

Embodiments of the present technology relate to an approach for feedback fly-height control and touchdown detection in a disk drive.

BACKGROUND

Disk drive devices which employ a variety of recording disks, such as optical disks, magneto-optical disks, or flexible magnetic disks, are known in the art, and among these, hard disk drives (HDD) are widely used as recording devices for computers, and are also used in many items of electronic equipment, such as video recording/reproduction devices or car navigation systems.

The magnetic disks, which are used in HDDs, comprise a plurality of data tracks and a plurality of servo tracks. One or more data sectors containing user data are recorded in each data track. Each servo track comprises address information. The servo tracks consist of a plurality of items of servo data which are arranged at intervals in the circumferential direction, and one or more data sectors are recorded between each item of servo data. A head element unit is able to write data to the data sectors or read data from the data sectors by accessing the required data sector in accordance with the address information of the servo data.

The head element unit is formed on a slider which is attached on top of a suspension of an actuator. The suspension and head-slider assembly is known as the head gimbal assembly (HGA). Furthermore, the actuator and head-slider assembly is known as the head-slider assembly (HSA). The pressure created by the viscosity of the air between the slider floating surface opposite the magnetic disk and the rotating magnetic disk is balanced with the pressured applied in the direction of the magnetic disk by the suspension so that the head-slider can float above the magnetic disk. The actuator is pivoted about a pivot shaft, whereby the head-slider is moved to the intended track and is also positioned above said track.

SUMMARY

According to an embodiment of the present technology, a system is provided comprising: a hard disk controller having a target input, a fly-height monitoring, a fly-height adjusting, a thermal fly-height control (TFC) power control, a sensing signal input, an embedded contact sensor (ECS) control, and a direct current resistance (DCR) slope to fly-height conversion, an arm electronics having a TFC Digital-to-Analog Converter (DAC), an ECS circuit, and an ECS resistance measurement, a head having a TFC heater, a generating protrusion, and an ECS, and a head disk interface (HDI) for the ECS sensing process on cooling, contact heating. This design provides these functions: a measurement of ECS DCR and its slope, a conversion of DCR slope to fly-height, fly-height output for timely monitoring and adjusting fly-height caused by sensing signal such as micro-waviness and lubricant moguls and/or buildup, adjusting heater power to keep a target fly-height by feedback fly-height change, adjusting. Timely monitoring and actively controlling on fly-height is achieved through ECS DCR slope.

According to an embodiment of the present technology, a system is provided comprising: a controller having a target input, a touchdown detection, a TFC power control, a sensing signal input, an ECS control, and a DCR slope to fly-height conversion, an arm electronics having a TFC DAC, an ECS circuit, and a resistance measurement, a head having a TFC heater, generating protrusion, and an ECS, and a HDI for the ECS sensing process on cooling, contact heating. This design provides these functions: a measurement of ECS DCR and its slope, a conversion of DCR slope to fly-height, and touchdown detection for judging whether fly-height is less than zero, a heater power control for reducing heat power till detected a contact. Touchdown detection is achieved using ECS DCR or its slope.

DESCRIPTION OF THE DRAWINGS

The accompanying drawings, which are incorporated in and form a part of this specification, illustrate embodiments of the present technology and, together with the description, serve to explain the embodiments of the present technology.

Figure 1:
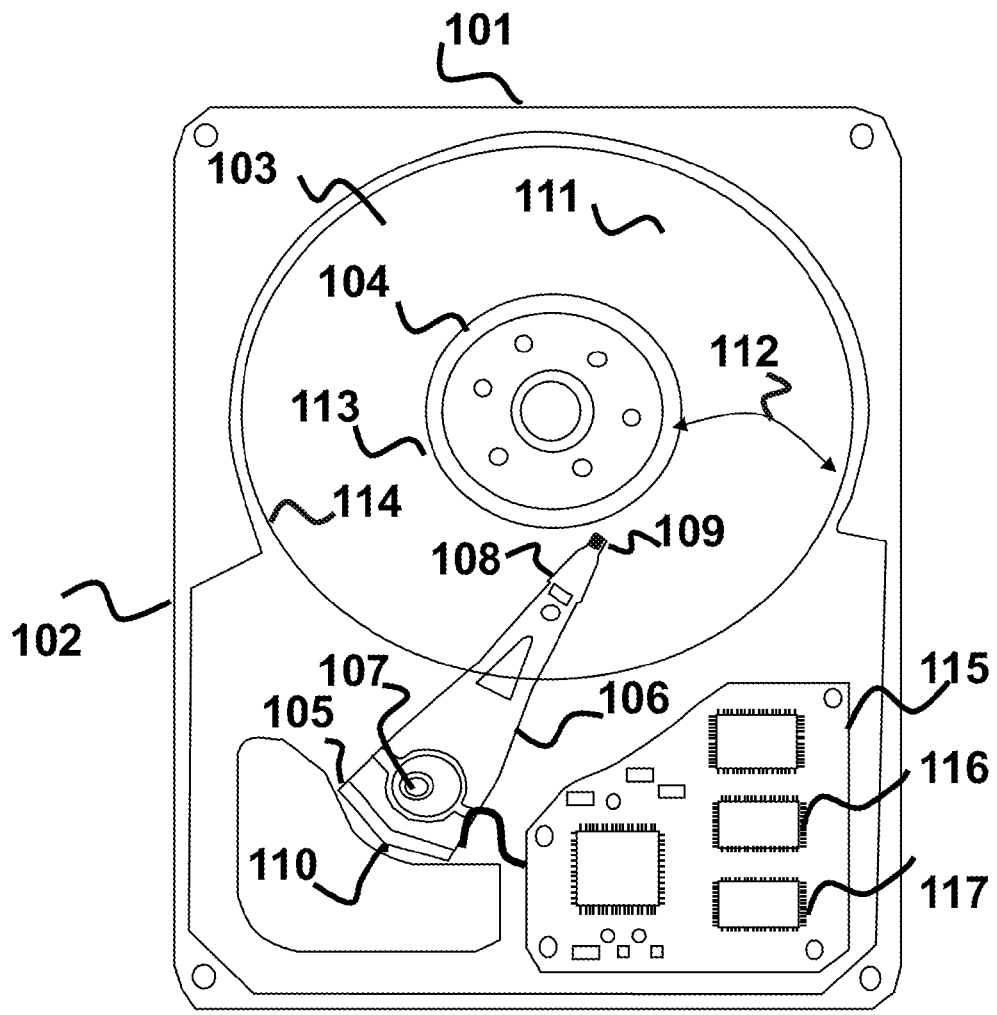
FIG. 1 illustrates an example of a HDD, in accordance with an embodiment of the present invention.

The drawings referred to in this description should not be understood as being drawn to scale except if specifically noted.

DESCRIPTION OF EMBODIMENTS

Reference will now be made in detail to the alternative embodiments of the present technology. While the technology will be described in conjunction with the alternative embodiments, it will be understood that they are not intended to limit the technology to these embodiments. On the contrary, the technology is intended to cover alternatives, modifications and equivalents, which may be included within the spirit and scope of the technology as defined by the appended claims.

Furthermore, in the following description of embodiments of the present technology, numerous specific details are set forth in order to provide a thorough understanding of the present technology. However, it should be noted that embodiments of the present technology may be practiced without these specific details. In other instances, well known methods, procedures, and components have not been described in detail as not to unnecessarily obscure embodiments of the present technology. Throughout the drawings, like components are denoted by like reference numerals, and repetitive descriptions are omitted for clarity of explanation if not necessary.

Overview

The present technology relates to hard disk drives (HDDs). More particularly, the present technology relates a method of dynamically monitoring and adjusting the clearance between magnetic head and magnetic storage media through the direct current resistance (DCR) or its slope of an embedded contact sensor (ECS).

Disk drives include read and write elements embedded in a slider, which flies over a recording media/disk. Increasing demand in data density requires that the read and write elements fly closer to the disk. Accordingly, the clearance between the slider and the disk is increasingly important as storage densities also increase.

A thermal fly-height control (TFC) heater can be disposed in a slider to control the slider near the read and write elements through thermal expansion, which lowers the fly-height for the read and write elements. It is desirable to determine the appropriate fly-height heater control signal, e.g., appropriated current and/or voltage applied to the heater, which is set a back off value from that at touchdown, which achieves a target fly-height for the head. Various methods, such as embedded contact sensor method, are used to detect touchdown contact and set a touchdown current and/or voltage of the TFC heater.

To verify the relative fly-height, the read-back signal's amplitude and a Wallace spacing loss relationship can be utilized. However, the read-back signal measurement may not provide an accurate fly-height due to reader and writer performance and disk magnetic performance. With a slider flying as close to as possible to a disk, head-disk contact may occur, which creates unstable slider-fly dynamics, which in turn, creates data imprint errors in the media. Moreover, fly-height is also affected by lubricant-slider interaction, intermolecular force, so on. Embodiments of the present technology provide to these and other problems, and offer advantages over the prior area are.

A way to increase recording density in which a magnetic disk drive records data without losing the reliability of the magnetic disk drive is to reduce fly-height across the entire surface of a magnetic disk, and to keep a constant and same fly-height in all drives under various variations such as micro-waviness and lubricant moguls and/or buildup by dynamically adjusting the TFC heater power.

Read and write elements or transducers reside in the slider of an HDD. As fly-heights diminish, it becomes more relevant to accurately control the head-disk distance, i.e., the distance between the read-write heads and the disk. One of the items that can negatively affect the fly-height of the slider is lubricant-slider interaction, such as lube pickup. The negative effects of this item can be diminished and/or eliminated by dynamically adjusting the thermal fly-height control heater. Dynamically controlling the heater's power reduces slider wear and allows for lower fly-heights.

Also, due to low fly-heights, measured in the nanometers, disk micro-waviness and disk lubricant moguls are factors that alter the topography of the surface of a disk enough to significantly alter a slider's fly-height above a disk surface, even within a single revolution of a disk. Other factors, such as temperature and altitude at which a disk drive operates, can also alter the fly-height of a slider in a significant manner. For example if a hard disk drive is operated at a high temperature or high altitude or both, fly-height of the slider may decrease unless there is some sort of active control. As such, the active fly-height control using embedded contact sensor resistance slope, as described herein, is useful for timely monitoring and actively controlling fly-height in a manner that is unaffected by variables such as temperature and altitude and which can quickly sense and react to minute disk surface variations such as micro-waviness and lubricant moguls and/or buildup.

The present technology has been made in view of such circumstances and it is therefore an object of the present technology to provide an effective approach and system design capable of monitoring and actively controlling fly-height using embedded contact sensor resistance or its slope, and also for contact detection.

According to the present technology, timely monitoring and actively controlling fly-height in HDDs is achieved using ECS DCR slope, and also touchdown detection in HDDs is achieved using ECS DCR or its slope.

Description of Embodiments of the Present Technology for Fly-Height Control and Touchdown Detection Reference will now be made in detail to embodiments of the present technology, examples of which are illustrated in the accompanying drawings. While the technology will be described in conjunction with various embodiment(s), it will be understood that they are not intended to limit the present technology to these embodiments. On the contrary, the present technology is intended to cover alternatives, modifications and equivalents, which may be included within the spirit and scope of the various embodiments as defined by the appended claims.

Furthermore, in the following description of embodiments, numerous specific details are set forth in order to provide a thorough understanding of the present technology. However, the present technology may be practiced without these specific details. In other instances, well known methods, procedures, components, and circuits have not been described in detail as not to unnecessarily obscure aspects of the present embodiments.

HDDs are commonly employed as storage devices for computers. In addition, HDDs are employed in many applications apart from computers, such as video image recording and/or reproduction devices and car navigation systems.

The magnetic disks that are employed in HDDs comprise a plurality of data tracks; one or more data sectors are recorded in these data tracks. Also, magnetic disks comprise a plurality of servo tracks: these servo tracks comprise a plurality of servo sectors that are separated in the circumferential direction. A head element section of a head slider that is supported on a swingable actuator can perform data writing to the data sectors and data reading from the data sectors by accessing desired data sectors in accordance with servo data address information.

Typically, a HDD comprises an Integrated Circuit (IC) or packaged IC, including an amplification circuit that amplifies a head slider signal, provided in an enclosure. The IC is usually fixed in the vicinity of the axis of swinging of an actuator. Consequently, in this specification, this IC is termed head IC or arm electronics. The amplification circuit in the arm electronics amplifies a user data signal and servo data signal that are read by the head slider, and, in addition, amplifies a user data signal that is written by the head slider. Apart from this amplification circuit, the arm electronics incorporates logic circuitry in order to achieve high functionality.

The arm electronics perform operations in accordance with instructions from the hard disk controller. The IC (or packaged IC), including the hard disk controller, is typically mounted on a control circuit board that is fixed on the outside of the HDD casing. The arm electronics are provided with registers and the hard disk controller controls the arm electronics by storing control data in these registers. For example, the arm electronics selects the head slider and alters the write current value or the sensor current value in accordance with instructions from the hard disk controller. Apart from these, another arm electronics function is to supply power to a TFC heater mounted on the head slider.

In order to improve recording density onto the magnetic disk, it is important to reduce the clearance between the magnetic disk and the head element that flies over the magnetic disk. In one embodiment, a heater is on the head slider and to adjust the clearance by heating the head element with this heater.

This technique will be referred to as TFC (Thermal Fly-height Control). In TFC, heat is generated by supplying current to the heater and the head element is caused to project by means of thermal expansion said protrusion that is thereby produced. In this way, the clearance between the magnetic disk and the head element can be reduced. The reduced amount of the clearance is determined by the amount of increasing TFC heater power.

In order to improve recording density, in one embodiment, clearance between the head slider and the magnetic disk has continued to be reduced and the currently employed clearance is a few nanometers (nm). The currently employed clearance is a value close to the limit, taking into consideration the margins required in HDD manufacture. In various embodiments, a contact sensor element is embedded in the head slider, so as to sense contact between the magnetic disk and head slider in situ.

An HDD can cope with problems regarding head-disk contact in situ by having a contact sensor element embedded in the head slider and actively monitoring contact of the head slider and the magnetic disk by using this element. For example, the HDD can control clearance in accordance with the head position by increasing the clearance, interrupting write processes, or maintaining the contact position. Consequently, the clearance margin between the head slider and the magnetic disk can be reduced by actively monitoring contact between the head slider and the magnetic disk and, as a result, the clearance in read processing and write processing can be reduced.

In one embodiment, a head slider includes: a reader element, a writer element, a TFC heater. In such embodiment, a supplied current is inputted to the heater, and the head element is caused to project by means of thermal expansion the protrusion that is thereby produced. The clearance between the magnetic disk and the head element can be reduced.

In one embodiment, a head slider includes: a reader element, a writer element, a TFC heater, and an ECS element. In such embodiment, an ECS element is embedded in the head slider. In such an embodiment, the arm electronics is provided with a receiver circuit (contact sensor circuit) of this sensor element.

The ECS element consists of a thin layer, the resistance of which changes with its temperature. The temperature of this sensor can be changed by the air bearing cooling and frictional induced heat at the head disk interface, hence by a resistance of this sensor is changed by the air bearing cooling and frictional heating.

In one embodiment, a disk drive includes: a head slider that accesses a disk; a thermal sensor element that senses the clearance between the head slider and the disk; a head IC having an amplification circuit section that amplifies the signal of the head slider, in the head IC, namely, arm electronics, that measures a resistance of thermal sensor and transfers it to the hard disk controller IC, that is shared with other functions of the head IC, that sets a current/voltage to the ECS controlled by the hard disk controller, that applies a power (adjusted power by hard disk controller) to the TFC heater so to make a change in the clearance.

In one embodiment, a disk drive includes: a head slider that accesses a disk; a thermal sensor element that senses the clearance between the head slider and the disk; a head IC having an amplification circuit section that amplifies the signal of the head slider (the arm electronics); a hard disk controller IC including a hard disk controller that accesses a register of the head IC for controlling the head IC, in the hard disk controller IC that receives the sensing signal which reflects the clearance change due to various variables such as micro-waviness of the disk, lubricant moguls and/or buildup, altitude, environmental temperature, so on in HDDs, that gets the difference between current measured fly-height and target fly-height, that controls TFC power to change heater power by the fly-height difference, that timely receives and registers a resistance of the ECS and calculates a DCR slope with TFC power by receiving resistance and previously registered resistance and corresponding to current TFC heater power and previously registered TFC heater power, that converts ECS DCR slope to fly-height by registered data, which is identified and measured, and monitors fly-height.

In another embodiment, a disk drive includes: a head slider that accesses a disk; a thermal sensor element that senses the clearance between the head slider and the disk; a head IC having an amplification circuit section that amplifies the signal of the head slider, the arm electronics; a hard disk controller IC including a hard disk controller that accesses a register of the head IC for controlling the head IC, in the hard disk controller IC that receives the sensing signal which reflects the clearance change due to various variables such as micro-waviness of the disk, lubricant moguls and/or buildup, altitude, environmental temperature, so on in HDDs, that adjusts flying height to get the difference between current measured fly-height and target fly-height, that controls TFC power to change heater power by the fly-height difference, that timely receives and registers a resistance of the ECS and calculates a DCR slope with TFC power by receiving resistance and previously registered resistance and corresponding to current TFC heater power and previously registered TFC heater power, that converts ECS DCR slope to fly-height by registered data, which is identified and measured, and judge whether fly-height is less than zero, a flying height less than zero indicates a contact occurring.

In one embodiment, a disk drive is a HDD. In this embodiment, a HDD can timely monitor fly-height and keep a target fly-height by actively adjusting the fly-height, and detect contact between the head slider and magnetic disk in term of the feedback ECS DCR or its slope.

The overall construction of a HDD in which is mounted a printed circuit board for timely monitoring and actively adjusting clearance, i.e. fly-height, between the head slider and the magnetic disk will now be described. FIG. 1 is a block diagram showing the overall construction of the HDD 101. The HDD 101 comprises a printed circuit board 115 that is fixed to the inside of a hard disk drive base 102. On the circuit board 115, there are mounted various circuits such as the hard disk drive hard disk controller 117 and arm electronics 116, comprising a read/write channel, motor drive unit 110, microprocessor unit (MPU) and logic circuits. The circuits are formed on a single IC, or packaged IC, or on different ICs, or packaged ICs.

HDD 101 has an outer housing or base 102 containing a disk pack having at least one media or magnetic disk 103. The disk or disks 103 are rotated by a spindle motor assembly having a central drive hub 104. An actuator 105 comprises a plurality of parallel actuator arms 106 (one shown) in the form of a comb that is movably or pivotally mounted to base 102 about a pivot assembly 107.

In the embodiment shown, a magnetic read/disk transducer or head is mounted on a slider 109 and secured to a flexure that is flexibility mounted to each suspension 108. The slider 109 is usually bonded to the end of suspension 108. Suspensions 108 have a spring-like quality, which biases or urges the air-bearing surface of the slider 109 against the disk 103 to cause the slider 109 to fly at a precise distance from the disk. A voice coil motor, associated with motor drive unit 110, rotates actuator 105 with its attached sliders 109 to position sliders 109 over a desired data track along a path 112 between a disk inner diameter 113 and a disk outer diameter 114. A thin lubricant 111 is dip-coated onto the hard carbon overcoat of magnetic disk 103 to protect from friction, wear and corrosion. The rotating magnetic disk 103 drag air under the sliders 109, and the air passing beneath the air surface is compressed to causes the air pressure between the disk and the air bearing surface to increase, which creates a hydrodynamic lifting force that counteracts the load force provided by suspensions 108 and causes the slider to lift and fly above or in close proximity to the magnetic disk 103 surface.

Figure 2:
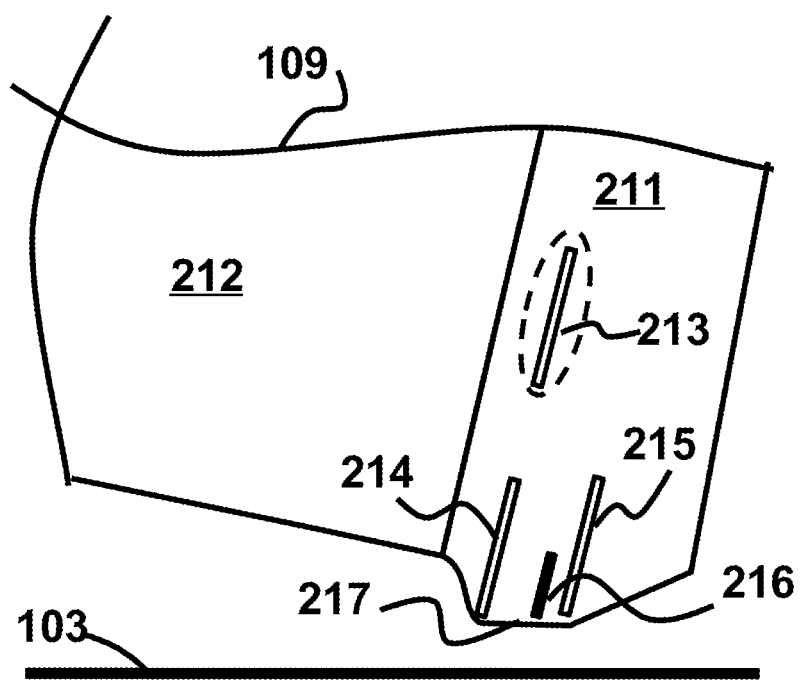
FIG. 2 illustrates an example of a head slider, in accordance with an embodiment of the present invention.

FIG. 2 is a view showing diagrammatically the construction of the head slider 109 of FIGS. 1 and 2. The head slider 109 comprises a slider 212 and an element section 211 that is formed at the trailing end face thereof. The element section 211 comprises a read element 214, a write element 215, TFC heater element 213, an ECS element 216, and protrusion 217. The head slider 109 flies over the magnetic disk 103 of FIGS. 1 and 2.

The TFC heater element 213 adjusts the clearance between the head element section 211 and the magnetic disk 103 by producing expansion and/or projection of the head element section 211 by means of heat. This TFC heater element 213 constitutes a clearance actuator that adjusts the clearance between the head element section 211 and the magnetic disk 103. Apart from clearance actuators using a heater element, clearance actuators are also known using for example electrostatic force between the magnetic disk 103 and head slider 109, or a piezoelectric element.

The ECS element 216 is a resistance element. When the head element section 211 flies or contacts the magnetic disk 103, the resistance value of the ECS element 216 changes due to the air-bearing cooling effect and frictional induced heat 331 at head disk interface 330. The clearance between the head 109 and the disk 103 can be sensed by measuring this change in resistance or resistance slope with TFC heater power of the ECS element 216.

Returning to FIG. 1, the head slider 109 is fixed at the tip of the actuator 105. The actuator 105 is linked with a voice coil motor, so that the head slider 109 is moved in the radial direction on the rotating magnetic disk 103 by rotation about the rotary shaft thereof. A motor driver unit 110 drives the voice coil motor in accordance with control data from a hard disk controller 117.

Figure 3:
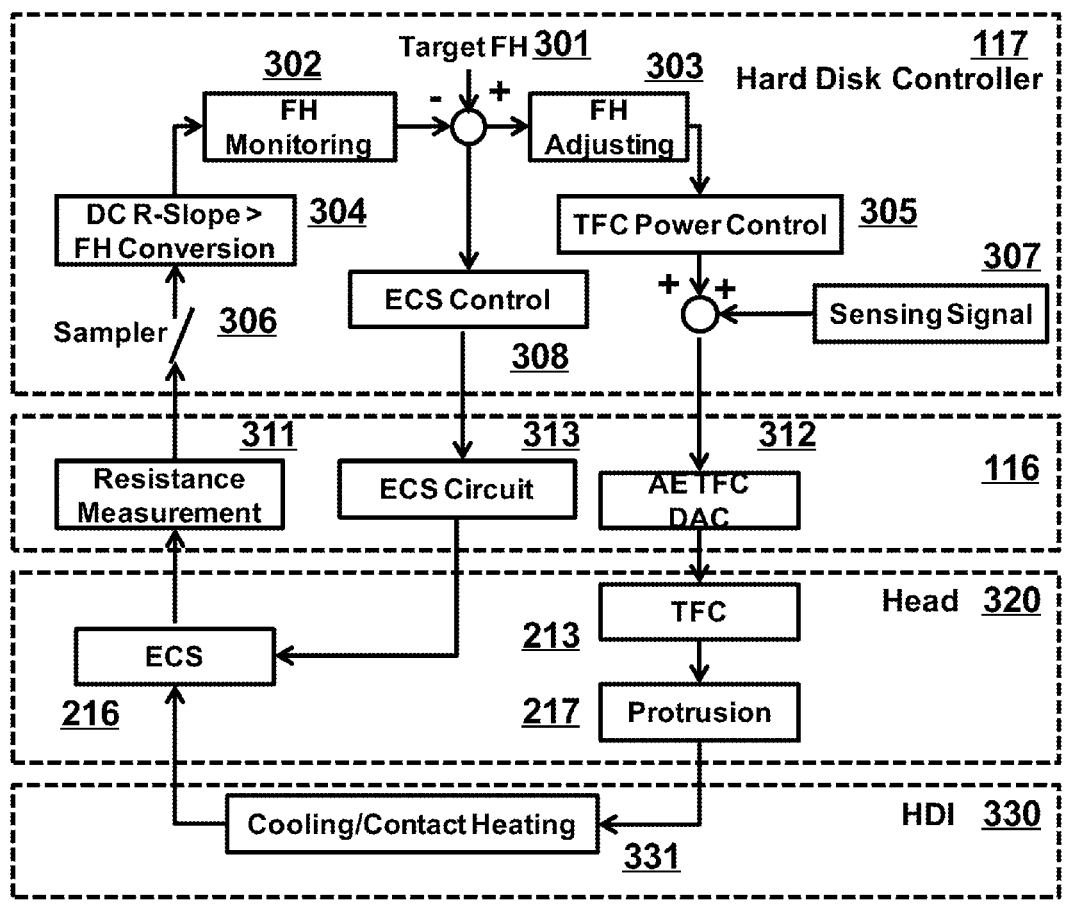
FIG. 3 is an illustration showing a configuration, in accordance with an embodiment of the present invention.

FIG. 3 is an illustration showing a configuration related to hard disk controller for timely monitoring and actively adjusting fly-height to keep a constant fly-height same as a target fly-height performed by the hard disk controller 117 of FIGS. 1 and 3, in accordance with an embodiment of the present technology. Hard disk controller 117 includes a target flight-height (FH) input 301, fly-height monitoring 302, fly-height adjusting 303, DCR slope to fly-height conversion 304, TFC power control 305, a sampler 306, sensing signal input 307, and ECS Control 308. FIG. 3 also depicts arm electronics 116 of FIGS. 1 and 3 having a TFC DAC 312, an ECS circuit 313 of FIGS. 1 and 3, and an ECS resistance measurement function 311. FIG. 3 also depicts a head 320 having a TFC heater element 213 of FIGS. 2 and 3, a generating protrusion 217 of FIGS. 2 and 3, and an ECS element 216 of FIGS. 2 and 3. In one embodiment, head 320 comprises a head IC. FIG. 3 also depicts head disk interface (HDI) 330 for the ECS sensing process on air bearing cooling and frictional induced heating 331.

In this embodiment, the TFC heater element 213 adjusts the clearance between the head element section 211 and the magnetic disk 103 by producing expansion and/or projection of the head element section 211 by means of heat. The resistance value of the ECS element 216 changes due to the air-bearing cooling effect and frictional induced heat 331 at head disk interface 330, and is measured in the arm electronics 116.

The arm electronics 116 constituting the head IC is an IC, or packaged IC, arranged inside the enclosure 102. Typically, the arm electronics 116 is fixed in the vicinity of the rotary shaft of the actuator 105. The arm electronics 116 selects a head slider 109 for accessing, i.e. reading or writing, the magnetic disk 103 from several head sliders 109, in accordance with control data from the hard disk controller 117, and performs amplification of the read/write signal.

Also, the arm electronics 116 functions as a power supply adjustment circuit that supplies power to the TFC heater element 213 of the head slider 109 that is selected in accordance with the control data from the hard disk controller 117 and adjusts the amount of power thereof.

Also, the arm electronics 116 functions as a bias current or voltage supply circuit that supplies current or voltage to the ECS element 216 of the head slider 109 that is selected in accordance with the control data from the hard disk controller 117. Also, the arm electronics 116 functions a resistance measurement function 311 that measure the resistance of the ECS element 216.

The hard disk controller 117 is the controller of the HDD 101 and comprises an MPU and hardware logic circuitry. The MPU operates in accordance with firmware loaded in the RAM. The hard disk control 117 executes overall control of the HDD 101 and necessary processing relating to data processing, such as read/write process control, management of the order of execution of commands, head positioning control, such as servo control, using the servo signal, and other functions.

The hard disk controller 117 controls the operation of the arm electronics 116 by setting control data in registers of the arm electronics 116.

The hard disk controller 117 controls the arm electronics 116 by storing control data in the control registers of the arm electronics 116. The arm electronics 116 is actually provided with a control register set comprising a plurality of control registers. The arm electronics 116 selects a head slider 109 in accordance with the values set in these control registers, or supplies to the head slider 109 write current or sensing current of the value set by the register. Also, the arm electronics 116 supplies, to a TFC heater element 213 of the head slider 109, heater power of the value indicated by the data that was set in the register in question by the hard disk controller 117. Furthermore, the arm electronics 116 supplies, to an ECS element 216 of the head slider 109, a current in current mode or a voltage in voltage mode of the value indicated by the data that was set in the register in question by the hard disk controller 117.

In one embodiment, the hard disk controller 117 can get the resistance of the ECS element 216 from arm electronics 116 and count the resistance slope, and convert it into a fly-height conversion 304. The hard disk controller 117 can timely output the value of fly-height as a function of monitoring fly-height 302.

In one embodiment, the hard disk controller 117 can compare the currently measured fly-height with setting target fly-height in the fly-height adjusting function 303, and count the difference between measured fly-height and target fly-height, and changes TFC power in the TFC power control 305 by the difference, the changed TFC power is applied in arm electronics 116 and inputted in the TFC heater element 213.

Figure 5:
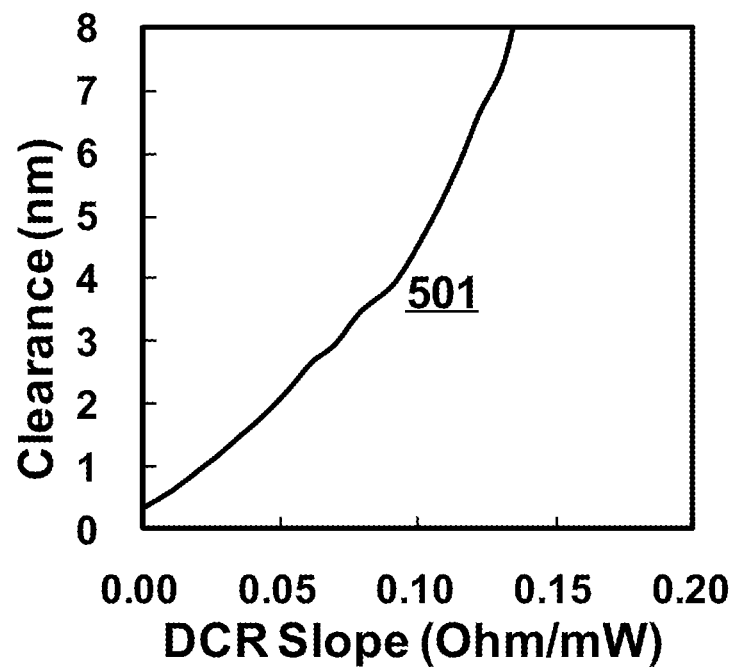
FIG. 5 graphically illustrates the relationship between clearance and embedded contact sensor direct current resistance slope, in accordance with an embodiment of the present invention.

FIG. 5 graphically illustrates the relationship between clearance and DCR slope of ECS of one sample, in accordance with this present embodiment. The relationship can be expressed as Equation 1.

$$\text{Clearance} = f(\text{DCR slope}) = a_n s^n + a_{n-1} s^{n-1} + \ldots + a_0, \quad \text{Equation 1}$$

In Equation 1, s is the measured DCR slope, $a_n, \ldots a_0$ are the coefficients which are got by fitting the measurement data. This relationship is stored in hard disk controller and used in the conversion of DCR slope to fly-height conversion 304.

Figure 6:
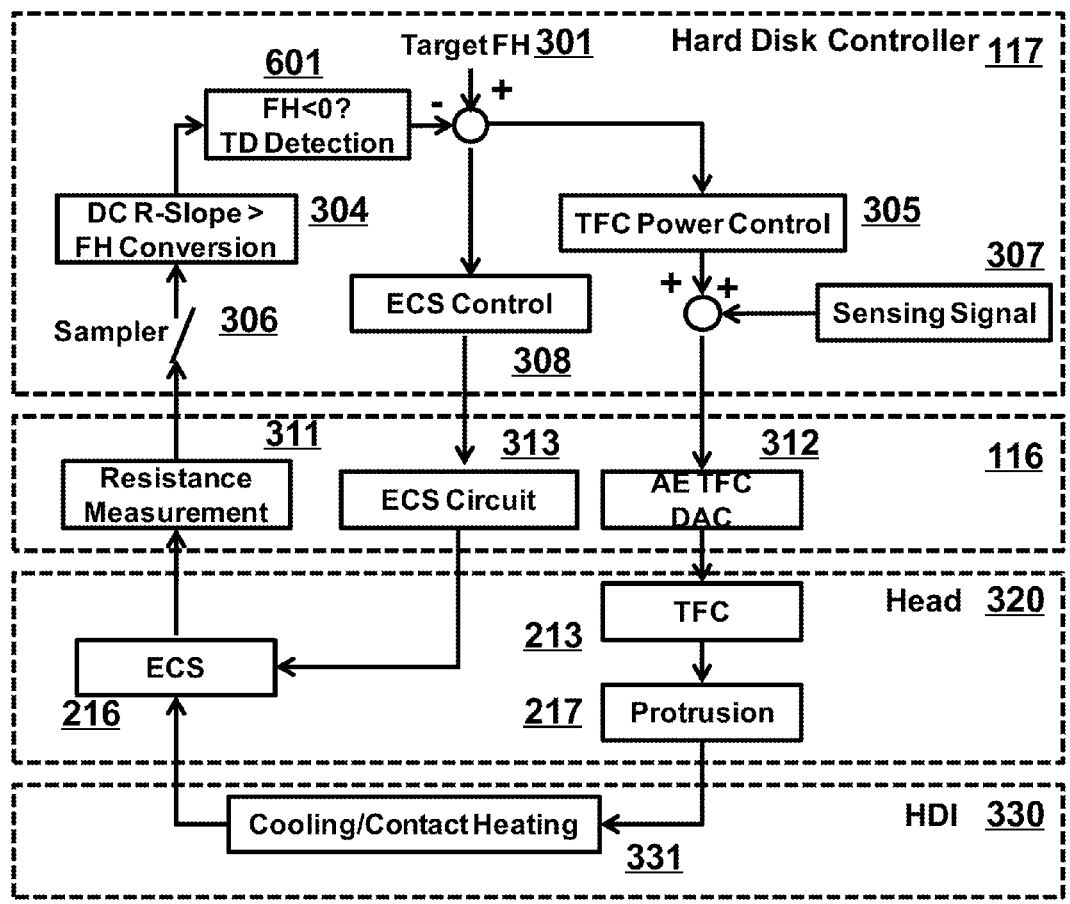
FIG. 6 is an illustration showing a configuration, in accordance with an embodiment of the present invention.

FIG. 6 is an illustration showing a configuration related to hard disk controller for touchdown detection performed by the hard disk controller 117 of FIGS. 1 and 3, in accordance with embodiments of the present technology. Hard disk controller 117 includes a target FH input 301, contact detection 601, DCR slope to fly-height conversion 304, TFC power control 305, a sampler 306, and sensing signal input 307.

In this embodiment, the hard disk controller 117 can get the resistance of the ECS element 216 from arm electronics 116 and count the resistance slope, and convert it into a fly-height conversion 304. The hard disk controller 117 can judge whether the current fly-height is less than zero, and detect a contact occurring 601.

Figure 4A:
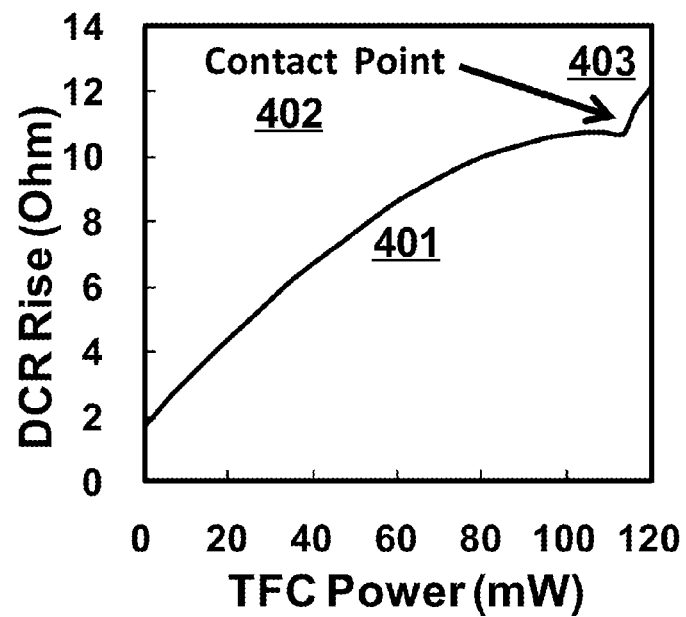
FIG. 4A graphically illustrates the relationship between embedded contact sensor direct current resistance and thermal fly-height control heater power, in accordance with an embodiment of the present invention.
Figure 4B:
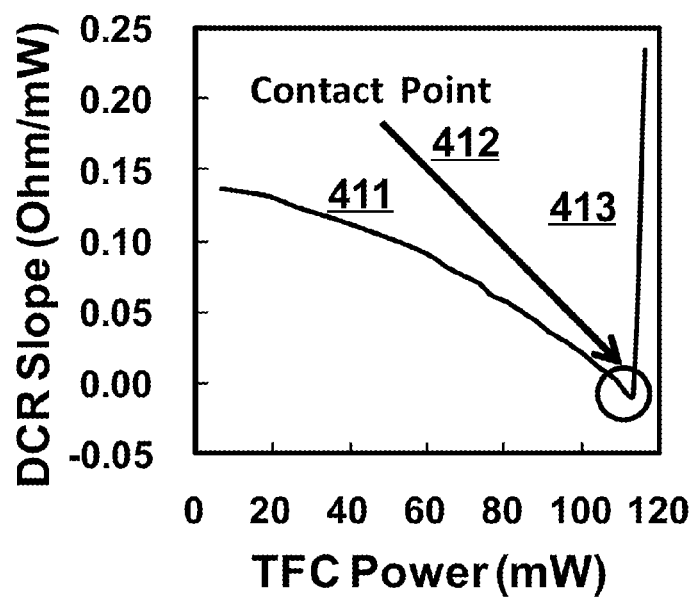
FIG. 4B graphically illustrates the relationship between embedded contact sensor direct current resistance slope and thermal fly-height control heater power, in accordance with an embodiment of the present invention.

FIG. 4A and FIG. 4B graphically illustrate the relationship between DCR rise and DCR slope and touchdown power, in accordance with embodiments of the present technology. 401 is the curve of DCR rise changing with TFC power before a contact, 402 is the contact point indicated by DCR rise, and 403 is the curve of DCR rise changing with TFC power after a contact. 411 is the curve of DCR slope changing with TFC power before a contact, 412 is the contact point indicated by DCR slope, and 413 is the curve of DCR rise changing with TFC power after a contact. These relations can be used to indicate a touchdown between the head and the disk in hard disk controller 117. A threshold is set for the value of DCR rise or DCR slope for contact detection. The relationships can be used by different ways.

In one embodiment, the contact detection 601 comprises a counter and comparative processing section. The counter counts the measured value of the ECS DCR of the ECS circuit 313 which may include a contact sensor element. A typical relationship between DCR rise versus TFC power is such that 401, 402 and 403. A comparative processing section compares the value of the counter with a predetermined threshold value and judge whether a contact occurs.

In another embodiment, the contact detection 601 comprises a counter and comparative processing section. The counter counts the measured value of the DCR slope of the ECS circuit 313 which may include a contact sensor element. A typical relationship between DCR slope versus TFC power is such that 411, 412 and 413. A comparative processing section compares the value of the counter with a predetermined threshold value and judge whether a contact occurs.

Typically, the HDD 101 is provided with a plurality of head sliders 109. The arm electronics 116 is provided with ECS circuit 313 which includes contact sensor circuit sections and resistance measurement function 311 respectively corresponding to these head sliders 109, or with a common contact sensor circuit section 313 for all (or some) of the head sliders 109. In one embodiment, the sensor DCR measuring the resistance measurement function 311 is common to all of the head sliders 109. In this way, the size of the circuitry can be reduced.

In various embodiments, processing by the arm electronics could be applied to disk drives employed in disks other than magnetic disks. The IC including the hard disk controller could be arranged within the casing. The IC including the hard disk controller may contain other circuit constituents, such as an RW channel or RAM. The number of magnetic disks of the HDD to which the present technology may be applied is not restricted and the present technology may be applied to read-only HDDs.

The foregoing descriptions of specific embodiments of the present technology have been presented for purposes of illustration and description. They are not intended to be exhaustive or to limit the technology to the precise forms disclosed, and many modifications and variations are possible in light of the above teaching. The embodiments described herein were chosen and described in order to best explain the principles of the technology and its practical application, to thereby enable others skilled in the art to best utilize the technology and various embodiments with various modifications as are suited to the particular use contemplated. It is intended that the scope of the technology be defined by the claims appended hereto and their equivalents.

What is claimed is:

1. An embedded contact sensor (ECS) element, comprising:
   said ECS element with a resistance that changes with a temperature change, that senses a clearance change between a head slider and a disk of a disk drive;
   a resistance measurement section, within said head IC, that determines a value of direct current resistance (DCR) of said ECS element, wherein said value of DCR changes with said temperature change, wherein said temperature change is caused by an air bearing cooling and frictional induced heating at a head disk interface; and
   a resistance slope to fly-height conversion section that dynamically determines a target fly-height value for said head slider over said disk based on changes in said value of DCR.

2. A disk drive comprising:
   an embedded contact sensor (ECS) element with a resistance that changes with a temperature change, that senses a clearance change between a head slider and a disk;
   a head integrated circuit (IC) comprising an amplification circuit section that amplifies a signal of said head slider;
   a resistance measurement section, within said head IC, that determines a value of direct current resistance (DCR) of said ECS element, wherein said value of DCR changes with a temperature change, wherein said temperature change is caused by an air bearing cooling and frictional induced heating at a head disk interface;
   a controller IC comprising a controller that accesses a register of said head IC for controlling said head IC; and
   a resistance slope to fly-height conversion section that dynamically determines a target fly-height value for said head slider over said disk based on changes in said value of DCR.

3. The disk drive of claim 2, further comprising:
   a flying height adjusting section that measures a difference between a target fly-height and a current fly-height, and sends a report to a TFC power control to change a TFC heater power to adjust said current fly-height to reach said target fly-height value.

4. The disk drive of claim 2, further comprising:
   a fly-height monitoring section that reports and records a fly-height in real time.

5. The disk drive of claim 2, wherein said value of DCR changes with a disturbance at said head disk interface wherein said disturbance is selected from the group of disturbances consisting of: disk surface variations, disk waviness, micro-waviness, lube buildup, lubricant moguls, and lube pickup.

6. The disk drive of claim 2, wherein said ECS element is applied by a constant direct current in current mode.

7. The disk drive of claim 2, wherein said ECS element is applied by a constant direct voltage in voltage mode.

8. The disk drive of claim 2, wherein said resistance measurement section is timely recording a resistance value of said ECS element sensing a clearance change between said head slider and said disk at said head disk interface.

9. The disk drive of claim 2, wherein said resistance slope to fly-height conversion section is dynamically recording fly-height by generating a resistance slope according to values of ECS resistance and thermal fly-height control (TFC) heater power reported by said head IC.

10. The disk drive of claim 9, wherein a relationship between a DCR slope and fly-height is determined and stored in said controller IC.

11. The disk drive of claim 2, further comprising:
a plurality of head sliders, wherein an identification section is common to said plurality of said head sliders.

12. The disk drive of claim 2, wherein a TFC power is reduced for a touchdown detection.

13. The disk drive of claim 2, further comprising:
a touchdown detection section to compare a measured fly-height value with a prescribed threshold value, and a fault signal for signaling an occurrence of a touchdown between said head slider and said disk.

14. A disk drive comprising:
an embedded contact sensor (ECS) element with a resistance that changes with a temperature change, that senses a clearance change between a head slider and a disk;
a head integrated circuit (IC) comprising an amplification circuit section that amplifies a signal of said head slider;
a resistance measurement section, within said head IC, that determines a value of direct current resistance (DCR) of said ECS element, wherein said value of DCR changes with said temperature change, wherein said temperature change is caused by an air bearing cooling and frictional induced heating at a head disk interface;
a controller IC comprising a controller that accesses a register of said head IC for controlling said head IC;
a resistance slope to fly-height conversion section that dynamically determines a target fly-height value for said head slider over said disk based on changes in said value of DCR; and
a flying height adjusting section that measures a difference between a target fly-height and a current fly-height, and sends a report to a TFC power control to change a TFC heater power to adjust said current fly-height to reach said target fly-height value.

15. The disk drive of claim 14, further comprising:
a fly-height monitoring section that reports and records a fly-height in real time.

16. The disk drive of claim 14, wherein said value of DCR changes with a disturbance at said head disk interface wherein said disturbance is selected from the group of disturbances consisting of: disk surface variations, disk waviness, micro-waviness, lube buildup, lubricant moguls, and lube pickup.

17. The disk drive of claim 14, wherein said resistance measurement section is timely recording a resistance value of said ECS element sensing a clearance change between said head slider and said disk at said head disk interface.

18. The disk drive of claim 14, wherein said resistance slope to fly-height conversion section is dynamically recording fly-height by generating a resistance slope according to values of ECS resistance and thermal fly-height control (TFC) heater power reported by said head IC.

19. The disk drive of claim 18, wherein a relationship between a DCR slope and fly-height is determined and stored in said controller IC.

20. The disk drive of claim 14, wherein a TFC power is reduced for a touchdown detection.

* * * * *